Feb. 27, 1945.  D. G. C. HARE  2,370,162
METHOD AND APPARATUS FOR LOGGING BORE HOLES
Filed Oct. 16, 1941
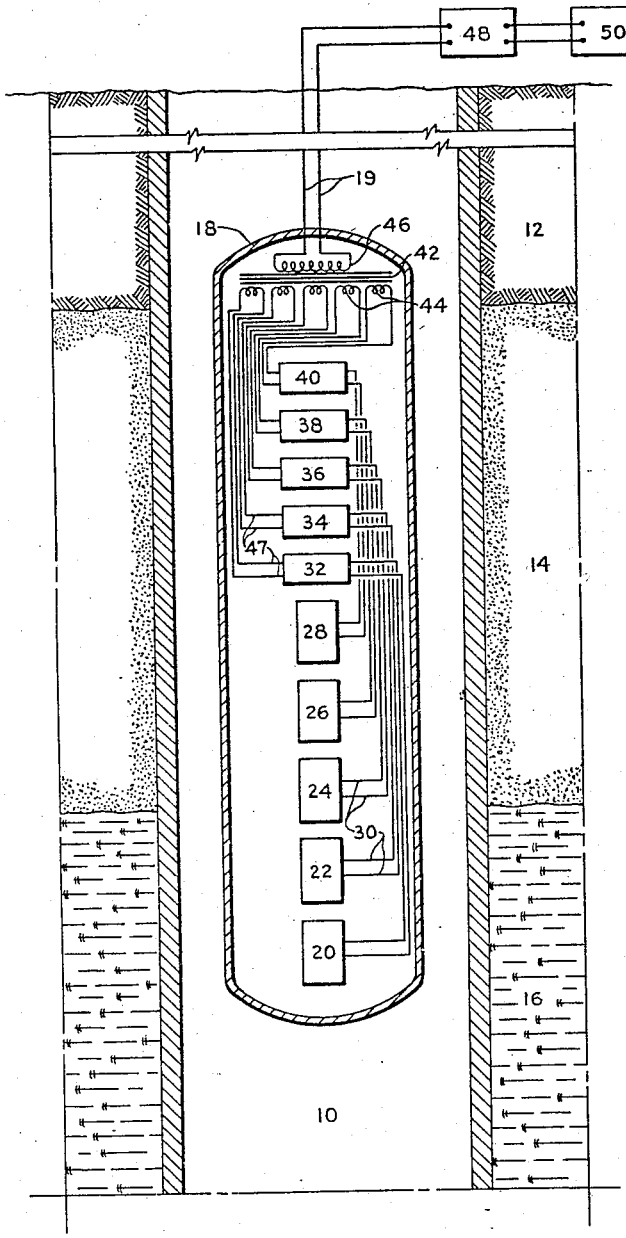
D.G.C. HARE
INVENTOR
BY
HIS ATTORNEY Patented Feb. 27, 1945

2,370,162

UNITED STATES PATENT OFFICE 2,370,162

METHOD AND APPARATUS FOR LOGGING BOREHOLES

Donald G. C. Hare, Houston, Tex., assignor, by mesne assignments, to The Texas Company, New York, N. Y., a corporation of Delaware Application October 16, 1941, Serial No. 415,197

7 Claims. (Cl. 250—83.6)

This invention relates to the surveying or logging of bore holes or wells and more particularly to a method and an apparatus by means of which the depth and thickness of the various formations or strata traversed by a bore hole can be accurately determined. The principal object of the invention is to provide a method and a means through the use of which the position of the interfaces or boundaries between adjacent formation layers can be determined more accurately than in the past.

In drilling an oil well it is, of course, desirable, if not essential, to have accurate information as to the location of the various formations through which the well is drilled, and several methods have been tried and some are in use for making such determinations. In accordance with one of these methods a detector of radiation is lowered through the hole and, since the natural radioactivity of the various formations are usually different, an indication can be obtained of the location of these formations by correlating the response of the detector with the depth of that instrument in the hole. It is difficult, however, to determine with sufficient accuracy the exact position of the different formations and this is particularly necessary where the stratum to be located is thin. Furthermore, in order to obtain good readings the detector must be lowered rather slowly and in logging deep holes this slow time factor is a distinct disadvantage.

In accordance with this invention a plurality of detectors of radiation are mounted in vertical spaced relation within a suitable housing adapted to be lowered through the hole on a cable, and also within the housing are a plurality of devices for providing electric oscillations each of which is connected to one of the detectors so that the carrier generated by an oscillator will be modulated in accordance with the output of one detector. Each oscillator supplies a carrier of a distinct frequency, and the output of the modulators is coupled to the wire cable passing upwardly to the surface. By means of a discriminating network at the surface the modulated carriers can be separated and recorded. In this manner, as the device is lowered through the hole into a certain formation, each of the vertically spaced detectors will respond to the change in radiation at a slightly different time, and by observing the record being made at the surface together with the depth of the device in the hole, an accurate determination can be made of the times when the instrument enters and leaves the formation. By using the accumulated output of the detectors this increased intensity of the reading would allow the hole to be traversed with much greater rapidity.

In my co-pending application, Serial Number 364,020, filed November 2, 1940, a radiation detecting device is disclosed which has proved to be many times more efficient than the conventional Geiger-Muller counter, and in my application filed concurrently herewith, Serial Number 415,194, an improved form of this radiation detector is disclosed. In each of the detectors disclosed in these co-pending applications the device comprises a plurality of thin metal plates disposed in parallel, separated relation within a housing or envelope and connected together electrically to form a cathode. A plurality of fine wires connected together to form the anode are disposed in the spaces between the cathode plates in such a manner as to suitably concentrate the field. The housing or envelope is filled with a gas such as Argon under a predetermined pressure and a positive electrical potential is applied to the anode. A particle of radiation or a gamma ray passing into the device may strike one or more of the cathode plates to eject an electron to ionize the gas and discharge or trip the counter. The detector disclosed in the application Serial Number 415,194 is of compact and rugged construction and lends itself particularly well to use in apparatus embodying this invention.

In another application being filed concurrently herewith, Serial Number 415,196, a method and an apparatus are disclosed for logging bore holes through determinations of variations in the radioactivity of the surrounding formations. In accordance with that invention, a single radiation detector is passed through the hole and the output of this detector is connected to a vacuum tube circuit in such a manner that a carrier generated by an oscillator in the housing with the detector will be modulated in accordance with the output of the detector. This modulated carrier is then coupled to a circuit which includes a wire cable from which the device is suspended and which circuit also supplies from the surface the current required by the vacuum tubes within the housing. The cable is connected at the surface to a band pass filter and the filtered output of this is then led to a suitable recording instrument. In this manner a two-wire cable connecting the device in the hole with the surface serves to transmit current to the device in the hole from the surface and also to transmit signals from the device to the surface where they are recorded. The present invention is to some extent a modification of the invention disclosed in copending application, Serial Number 415,196.

For a better understanding of the invention reference may be had to the accompanying drawing in which the single figure shows somewhat diagrammatically a vertical section through a bore hole having a multi-detector device suspended therein.

Referring to the drawing, a bore hole 10 is shown as having been drilled through various formations such as 12, 14 and 16, and it is assumed that information is desired as to the exact location of one of these formations such as 14. A suitable housing 18 is suspended from a cable 19 which may consist of or comprise a pair of electric wires connecting the apparatus in the housing 18 to the surface, as will be described.

Within the housing 18 are disposed a plurality of radiation detectors 20, 22, 24, 26 and 28 which may be conventional Geiger-Muller counters or which are preferably radiation detectors of the type described in my aforementioned co-pending patent application, Serial Number 415,194. These detectors are arranged in vertically separated positions within the housing and each detector is connected as by wires 30 with one of a plurality of oscillator-modulator devices 32, 34, 36, 38 and 40. Each of these oscillator-modulators is preferably, although not necessarily, constructed as described in my aforementioned copending application, Serial Number 415,196, but since the particular type of this apparatus does not form a part of the present invention, it will not be described in detail.

In the upper end of the housing 18 means are shown for coupling the output of the oscillator-modulators 32 through 40 to the cable 19. This means is shown rather diagrammatically as comprising a multi-winding transformer 42 having a plurality of primary coils 44 and a single secondary coil 46. Each of primary coils 44 is connected by wires 47 so as to receive the output of one of the oscillator-modulators 32, 34, etc., and the secondary coil 46 is connected directly through the cable 19 to a suitable band pass filter 48, the output of which is passed to a recording device 50 which may be a multi-element oscillograph.

In operation, the detecting device is lowered through the hole 10 by means of the cable 19 and a record is kept by any suitable means, not shown, of the depth of the device in the hole. As the device is lowered through the formations 12, 14 and 16 the detectors 20 through 28 will pick up varying amounts of radiation depending upon the nature of the various formations encountered. As before stated, the output of each detector passes to one of the oscillator-modulators 32 through 40 and a carrier having a discrete frequency generated by each oscillator is modulated, this modulated carrier then being coupled to the cable 20 by means of the transformer 42. The outputs of the individual counters may be recorded individually or the sum or difference of two or more counters may be recorded. By connecting all of the detectors 20 through 28 together the accumulation of the output of such a large number of detectors would represent a high average response from the radioactivity of the formations traversed by the bore hole. This would, of course, entail loss of vertical resolution since it would tend to spread out the response of a thin sand section. However, the increased intensity of the readings would allow the bore hole to be traversed with much greater rapidity and the size and the nature of the individual anomalies whose presence would be made apparent by the accumulated reading could be determined by an examination of the individual response traces of the oscillograph 50. One could also traverse the bore hole at a high speed and use the accumulated output to detect the presence of an anomaly which could then be examined in detail by reducing the rate of speed in that vicinity and utilizing the output of the individual detectors.

It is not necessary that all of the detectors 20–28 be of the same type. It is believed apparent that one could, for instance, have a group of high efficiency gamma ray detecting devices such as 20–28 together with one or more neutron logging devices including detectors to record slow or fast neutrons. In this case a source of neutrons would be placed in the housing 18 as is disclosed in my U. S. Letters Patent 2,334,262, granted November 16, 1943.

The advantage of using only a single cable and permitting a variation of the effective length of a given nest of counters will be apparent. For example, assuming a single counter about 10 feet long, as this device penetrates a formation of, say, only 10 feet in thickness there will be an instant change in the intensity of measurement which may vary as the whole length of the counter traverses the formation. However, if the counter is composed of small individual units separated electrically as has been described, the record at the surface will indicate the instant the lower end of the counter enters or leaves the formation.

Obviously many modifications and variations of the invention, as hereinbefore set forth, may be made without departing from the spirit and scope thereof and, therefore, only such limitations should be imposed as are indicated in the appended claims.

I claim:

1. The method of logging the formations traversed by a bore hole which comprises lowering through said hole a plurality of radiation detectors disposed in separated vertical relation, said detectors being responsive to natural gamma radiation emitted by said formations, modulating a carrier wave by the output of each detector, the frequency of each carrier differing from those of the other carriers, transmitting said carriers over a cable to the surface, separating said carriers and recording the carrier modulated by each detector.

2. The method of logging the formations traversed by a bore hole which comprises lowering through said hole a plurality of radiation detectors disposed in separated vertical relation, said detectors being responsive to the natural radiation emitted by said formations, transmitting to the surface signals influenced by the output of each of said detectors, continuously recording said signals as the detectors are moved through the hole, continuously measuring the depth of the detectors in the hole, and determining from the variations in the differences between the output of two or more of said detectors the nature of the formations traversed by said hole.

3. A device for logging the formations traversed by a bore hole comprising an elongated housing, a plurality of radiation detectors disposed in said housing in vertically separated positions, said detectors being responsive to natural gamma radiation emitted by said formations, a plurality of oscillators in said housing, a modulator connected to each of said detectors and to one of said oscillators for modulating a carrier generated by said oscillator, an electric cable circuit leading from said housing to the surface, means for coupling the output of each modulator to said cable circuit, filtering means at the surface for separating the modulated carriers and means for recording said separated modulated carriers.

4. A device for logging the formations traversed by a bore hole comprising an elongated housing, a plurality of radiation detectors disposed in said housing in vertically separated positions, an oscillator-modulator in said housing for each of said detectors, each of said oscillators having a discrete frequency of oscillation, means for connecting each detector to one of said oscillators so that the carrier generated by the oscillator will be modulated by the output of the detector to which it is connected, an electric cable leading from said housing to the surface, means for coupling the output of each oscillator to said cable, means at the surface connected to said cable for separating the modulated carriers and means for recording said separated modulated carriers.

5. The method of logging the formations traversed by a bore hole which comprises passing through said hole more than two radiation detectors disposed in substantially vertical alignment, transmitting to the surface signals indicating the sum of the outputs of all of said detectors, and, when the presence of an anomaly is indicated by said response, again passing said detectors through that portion of the hole where the anomaly is suspected while transmitting to the surface signals indicating the individual output of two of said detectors and continuously recording said outputs and the depth of the detectors in the hole to indicate the exact position of the boundaries of said anomaly.

6. The method of logging the formations traversed by a bore hole which comprises passing through said hole a plurality of radiation detectors disposed in substantially vertical alignment, continuously measuring the depth of the detectors in the hole, transmitting to the surface signals indicating the accumulated output of said detectors to obtain a high average response from the radioactivity of the formation traversed by the hole, and, when the presence of an anomaly is indicated by said response, again passing said detectors through that portion of the hole where the anomaly is indicated while transmitting to the surface signals indicating the output of each of said detectors and continuously recording said outputs to indicate the exact position of the boundaries of said anomaly.

7. The method of logging the formations traversed by a bore hole which comprises passing through said hole at a predetermined speed a plurality of radiation detectors disposed in substantially vertical alignment, continuously measuring the depth of the detectors in the hole, transmitting to the surface signals indicating the accumulated output of said detectors, and, when the presence of an anomaly is roughly indicated by said response, again passing said detectors through that portion of the hole where the anomaly is suspected at a lower rate of speed while transmitting to the surface signals indicating the output of each of said detectors and continuously recording said outputs to indicate the exact position of the boundaries of said anomaly.

DONALD G. C. HARE.